No. 857,228. PATENTED JUNE 18, 1907.
T. BOYD.
BAKING PAN.
APPLICATION FILED FEB. 28, 1907.
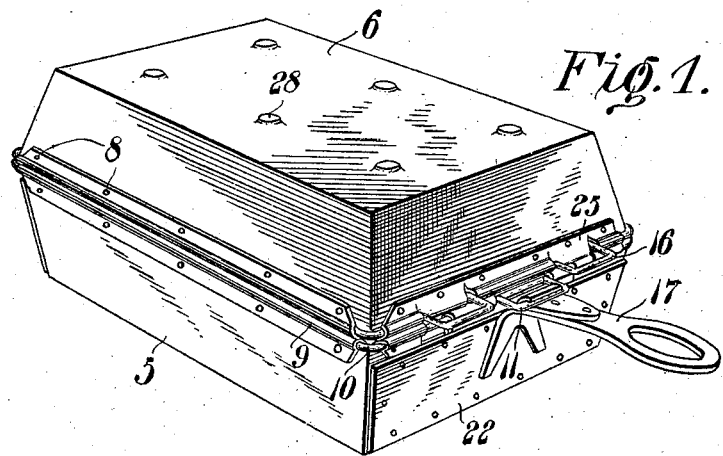
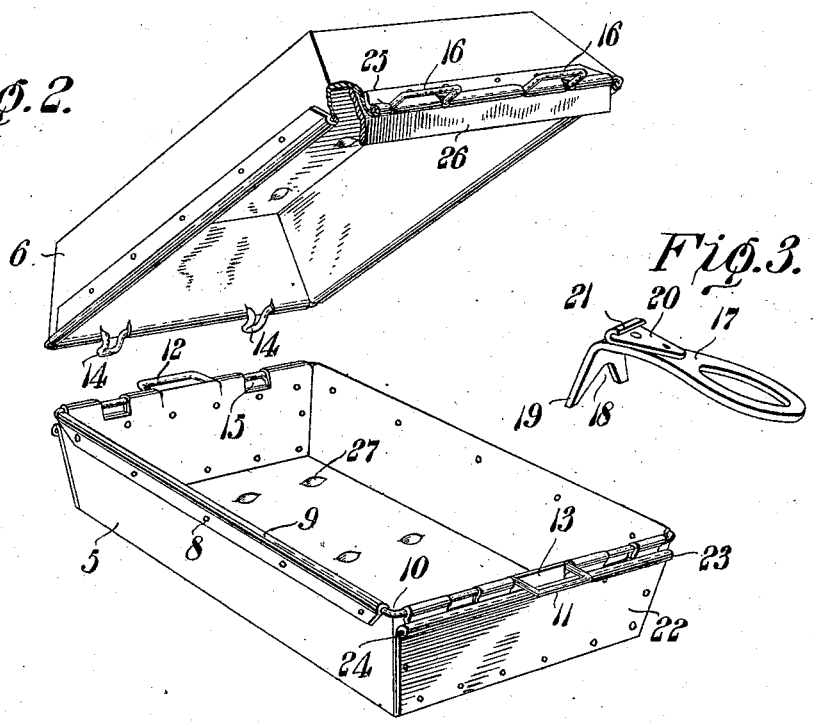
WITNESSES: Thomas Boyd, INVENTOR
By C. A. Snow & Co.
ATTORNEYS

UNITED STATES PATENT OFFICE.

THOMAS BOYD, OF ELGIN, OREGON.

BAKING-PAN.

No. 857,228.     Specification of Letters Patent.     Patented June 18, 1907.

Application filed February 28, 1907. Serial No. 359,786.

*To all whom it may concern:*

Be it known that I, THOMAS BOYD, a citizen of the United States, residing at Elgin, in the county of Union and State of Oregon, have invented a new and useful Baking-Pan, of which the following is a specification.

This invention relates to baking pans and has for its object to provide a comparatively simple and inexpensive device of this character by means of which bread, meats and other articles of food may be thoroughly cooked or baked without danger of burning the same.

A further object of the invention is to provide a baking pan including superposed mating sections one of which constitutes the top and the other the bottom of the pan, said sections being pivotally united so as to permit the upper section to be swung laterally to open position thereby to expose the contents of the pan.

A further object of the invention is to provide the pan with a detachable operating lever to assist in positioning the pan in or removing the pan from the oven and also to facilitate carrying the pan from place to place.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a perspective view of a baking pan constructed in accordance with my invention. Fig. 2 is a similar view showing the sections of the pan separated. Fig. 3 is a perspective view of the operating lever or handle detached.

Similar numerals of reference indicate corresponding parts in all of the figures of the drawings.

The improved baking pan which may be formed of sheet metal or other suitable material is preferably substantially rectangular in shape, as shown and formed of pivotally united sections 5 and 6 one of which constitutes the bottom of the pan and the other the top or cover.

The upper edge of the metal forming the side and end walls of the pan sections is bent downwardly and riveted or otherwise rigidly secured to the adjacent walls of the pan sections, as indicated at 8 to form a marginal reinforcing bead 9 in which is seated a strengthening rod or wire 10. The reinforcing wire 10 of the lower section 5 is extended laterally at the end walls of the pan to form intermediate loops or handles 11 and 12, the reinforcing bead at said handles being preferably cut away to form a smooth bearing surface 13. The reinforcing wire of the upper section 6 is extended laterally at the rear wall of the pan to form spaced laterally extending hooks 14 which enter suitable recesses 15 formed in the rear wall of the lower section 5 and bear against the adjacent portion of the reinforcing wire of the lower section, said hooks constituting hinges so that the upper section may be moved laterally to open position thereby to expose the contents of the pan. The reinforcing wire of the upper section 6 is also extended laterally at the front wall of said section to form spaced loops or finger pieces 16 by means of which the upper section may be readily moved to open and closed position.

Associated with the pan is a lifting lever 17 one end of which is bent at substantially right angles to the longitudinal plane of the lever and provided with a terminal bifurcation 18 forming spaced arms 19 adapted to bear against the adjacent wall of the lower pan section 5, there being a plate 20 riveted or otherwise secured to the body portion of the lever and provided with a terminal laterally extending hook 21 adapted to engage the adjacent handle or loop 11 thereby to lock the handle in engagement with the pan when it is desired to remove the pan from an oven or transport said pan from place to place.

As a means for reinforcing the front and rear walls of the lower pan section there are provided suitable auxiliary plates 22 preferably of the same shape and size as the end walls of the pan and riveted or otherwise rigidly secured to the exterior walls thereof, as shown. The upper edge of each plate is preferably curved to form a longitudinally disposed strengthening bead 23 for the reception of a wire or rod 24 thereby to prevent the end walls of the pan from buckling or being pressed inwardly when the weight of the pan is supported on the lifting lever.

While it is preferred to reinforce and strengthen the plates 22 by the provision of the longitudinal beads 23 it is obvious that said beads may be dispensed with so as to present a smooth unobstructed bearing surface, as illustrated in Fig. 1 of the drawings.

Riveted or otherwise rigidly secured to the front wall of the upper or movable section 6 is a reinforcing plate 25 the lower edge of which is extended beyond the adjacent marginal bead 9 and bent laterally to form a depending guide lip 26 which bears against the interior face of the front wall of the lower pan section when the upper section is moved to closed position, said lip by engagement with the adjacent wall of the lower pan section serving to lock the hooks or hinges 14 in engagement with the recesses 15 and thus prevent accidental displacement of the pan sections.

The bottom of the lower section 5 is preferably stamped, pressed or otherwise formed with a series of depressions 27 forming depending lugs or projections 28 which bear against the bottom of the oven and serve to prevent burning or scorching the food when cooking the latter, there being similar depressions or lugs 28 formed on the upper section 6 for supporting the bottom of said pan in elevated position when the upper section is detached from the lower section and used in the ordinary manner.

When it is desired to remove the pan from the oven or carry the pan from place to place the lifting lever 17 is placed in position on either end of the pan with the spaced arms 19 bearing against the adjacent reinforcing plate 22 and with the rearwardly extending hook 21 engaging the cross arm of the loop 11, as best shown in Fig. 1 of the drawings and in which position the entire weight of the pan will be sustained or supported by the handle so that the pan may be transported without danger of burning or otherwise injuring the hand of the operator. By having the handle engaging loops 11 formed on the opposite ends of the lower pan section, said pan may be readily removed from the oven by positioning the handle in either loop.

From the foregoing description it will be seen that there is provided an extremely simple, inexpensive and efficient device admirably adapted for the attainment of the ends in view.

Having thus described the invention what is claimed is:

1. A baking pan including upper and lower pivotally connected sections, the upper edge of the lowermost section being beaded, a wire extending through the bead and bent outward at the central portions of the ends of said section to form loops for engagement with the hooked portion of a lifting lever, and reinforcing plates permanently secured to the opposite end walls of the lower pan section and extending over the entire surface of said walls beneath the loops, said plates forming a brace for engagement with the lower portion or foot member of said lifting lever.

2. A baking pan comprising upper and lower pivotally connected sections, the lower section having a beaded edge, a wire extending through the beaded edge and bent outward at one end of said section to form a lifting loop for engagement by a lifting lever, portions of the beaded end walls of the lower section being cut away to expose the wire, and the upper section having a similarly beaded edge, and a wire extending through the bead, the wire of the upper section being bent outward forming hooks which pivotally engage with the exposed portions of the wire of the lower section, and a removable plate secured to the end wall of the lower section and extending over the entire surface of the wall beneath said loop.

3. A baking pan including pivotally connected sections, loops extending outward from the opposite end walls of the lower section for engagement with a lifting lever, reinforcing plates permanently secured to said end walls and extending over the entire surface of said walls beneath the loops to form bearing surfaces with which the lower portion of such lifting lever may engage, and an inwardly bent guide lip depending from the upper section and adapted to engage the adjacent end wall of the lower section when the two sections of the pan are closed.

4. A baking pan including a substantially rectangular receptacle having its upper edge provided with a marginal bead, a reinforcing wire extending through the bead and bent outward at one end of the pan to form a loop for engagement with a lifting lever, and a reinforcing plate permanently secured to the end wall of the pan and extending over the entire surface of the wall beneath said loop, said reinforcing plate having a beaded edge forming a bearing surface to be engaged by the lower portion of the lifting lever.

In testimony that I claim the foregoing as my own, I have hereto affixed my signature in the presence of two witnesses.

THOMAS BOYD.

Witnesses:
HENRY PROCTER,
J. H. BUELL.